(12) United States Patent
Zhang et al.

(10) Patent No.: US 8,209,150 B2
(45) Date of Patent: Jun. 26, 2012

(54) MOBILE SPEED AND DOPPLER FREQUENCY ESTIMATION USING CYCLOSTATIONARITY

(75) Inventors: Hong Zhang, Edison, NJ (US); Ali Abdi, New Milford, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 892 days.

(21) Appl. No.: 11/944,279

(22) Filed: Nov. 21, 2007

(65) Prior Publication Data

US 2008/0211719 A1 Sep. 4, 2008

Related U.S. Application Data

(60) Provisional application No. 60/867,116, filed on Nov. 23, 2006, provisional application No. 60/867,119, filed on Nov. 23, 2006.

(51) Int. Cl.
*H03F 1/26* (2006.01)
(52) U.S. Cl. .......................................... 702/189; 342/461
(58) Field of Classification Search .................. 702/189, 702/182–185, 188, 76, 77, 78, 79; 342/418, 342/462
See application file for complete search history.

(56) References Cited

U.S. PATENT DOCUMENTS 5,585,805 A * 12/1996 Takenaka et al. ............. 342/461
6,658,045 B1 12/2003 Jin et al.
7,254,369 B2 8/2007 Chappaz

FOREIGN PATENT DOCUMENTS

| EP | 1646172 | 4/2006 |
|---|---|---|
| JP | 2003-152616 | 5/2003 |
| KR | 10-2006-0098942 | 9/2006 |

OTHER PUBLICATIONS

Hong Zhang et al: "WLCp2-08: Cyclostationary-based Mobile Speed Estimation in Fading Channels: Blind and Data-Aided Approaches," Global Telecommunications Conference, 2006. GLOBECOM '06. IEEE, IEEE, PI, (Nov. 2006), pp. 1-5, XP031075921 ISBN: 1-4244-0356-1 the whole document.
Mazzenga F: "Blind Adaptive Parameter Estimation for Coma Systems Using Cyclostationary Statistics," European Transactions on Telecommunications, Wiley & Sons, Chichester, GB, vol. 11, No. 5, (Sep. 2000), pp. 495-500, XP000969940 ISSN: 1124-318X abstract paragraphs [0001], [03.1].

(Continued)

*Primary Examiner* — Edward Raymond
(74) *Attorney, Agent, or Firm* — Connolly Bove Lodge & Hutz LLP

(57) ABSTRACT

Embodiments of the invention exploit cyclostationarity of linearly modulated signals, transmitted through fading channels, to provide robust blind and data-aided mobile speed estimators. Embodiments of the invention utilize at least two methods of cyclic-correlation- and cyclic-spectrum-based methods and extension to space-time speed estimation at the base station in macrocells. In comparison with background art methods, the new estimators of the embodiments of the invention can be used without any need for pilot tones, and are robust to additive stationary noise or interference of any color or distribution. In addition, embodiments of the invention can also be implemented blindly, which can increase the data throughput. Performance results of the estimators of the embodiments of the invention are illustrated via extensive Monte Carlo simulation results.

38 Claims, 9 Drawing Sheets

OTHER PUBLICATIONS

Huang Z-T et al: "Joint estimation of Doppler and time-difference-of-arrival exploiting cyclostationary property," IEE Proceedings: Radar, Sonar & Navigation, Institution of Electrical Engineers, GB, vol. 149, No. 4, (Aug. 2, 2002), pp. 161-165, XP006018672 ISSN: 1350-2395 abstract—paragraphs [0001], [002.], [003.].

Min Yi et al: "Delay and doppler estimation using cyclostationarity based cross correlation in a multipath environment," The 2002 45th. Midwest Symposium on Circuits and Systems. Conference Proceedings. Tulsa, OK, Aug. 4-7, 2002; [Midwest Symposium on Circuits and Systems], New York, NY : IEEE, US, vol. 2, (Aug. 4, 2002), pp. 426-428, XPO10635416 ISBN: 978-0-7803-7523-9 abstract paragraph [002.].

PCT Notification of Transmittal of the International Search Report and the Written Opinion of the International Searching Authority, or the Declaration, PCT/US2007/085436, Form PCT/ISA/220 (Oct. 2005).

Notification Concerning Transmittal of International Preliminary Report on Patentability with Written Opinion issued in related International Application No. PCT/US2007/085436 on May 26, 2009.

Mitsuo Sakamoto, et al., "Time Correlation Based Maximum Doppler Frequency Estimator for W-CDMA Receiver" Nokia Research Center, 2-13-5, Nagata-cho, Chiyoda-ku, Tokyo, 100-0014 Japan 2011.

* cited by examiner

MOBILE SPEED AND DOPPLER FREQUENCY ESTIMATION USING CYCLOSTATIONARITY

CROSS REFERENCE TO RELATED APPLICATIONS

The present application is a non-provisional application which claims priority to provisional application No. 60/867,116, filed Nov. 23, 2006 and provisional Application No. 60/867,119, filed on Nov. 23, 2006.

FIELD OF THE INVENTION

Embodiments of the invention may generally relate to mobile communication systems. More specifically, embodiments of the invention are used for the estimation of the speed of the mobile units in mobile communication systems.

BACKGROUND OF THE INVENTION

Speed of a mobile unit in a communications network may relate to the rate of wireless mobile channel variations. Consequently, one may wish to be able to obtain estimates of the speed of a mobile unit, in order to aid such functions as, for example, handoff, adaptive modulation, adaptive equalization, power control, etc.

Speed estimation may be done based on signals received at the mobile unit and/or at a base station or other fixed station of a network. However, received signals are generally corrupted by noise, fading, and the like.

Speed estimation, or equivalently, Doppler frequency estimation (i.e., because Doppler frequency is proportional to speed) may employ, for example, crossing-based methods or covariance-based methods. However, the accuracy of such estimates may tend to drop with increasing amounts of noise, interference, fading, etc. Furthermore, such estimators tend to be complex to implement and generally require the use of pilot symbols and/or signals.

Accurate estimation of the mobile speed which reflects the rate of wireless mobile channel variations is important for many applications such as handoff, adaptive modulation and equalization, power control, etc. Almost all background art methods for speed estimation are based on transmitted pilot tones.

SUMMARY OF THE INVENTION

One embodiment of the invention is a method of estimating a Doppler frequency corresponding to a mobile station in a communication system, comprising correlating one or more received signals that contain no pilot symbols, the signals being correlated with themselves and/or with one another.

Another embodiment of the invention is a method of estimating a Doppler frequency corresponding to a mobile station in a communication system, comprising: receiving a signal from one or more mobile stations; differentiating the received signal; correlating the received signal; correlating the differentiated received signal; processing the correlated received signal and the correlated differentiated received signal; and generating the estimate of the Doppler frequency from the processed signals.

Yet another embodiment of the invention is a method of estimating a Doppler frequency corresponding to a mobile station in a communication system, comprising: receiving a signal from one or more mobile stations; correlating the received signal; windowing and discrete time Fourier transform (DTFT) processing the correlated received signal; processing the windowed and (DTFT) processed correlated received signal; and generating the estimate of the Doppler frequency from the processed signals.

Another embodiment of the invention is a method of estimating a Doppler frequency corresponding to a mobile station in a communication system, comprising: receiving signals at multiple antennas from one or more mobile stations; cross-correlating the multiple received signals; computing phase for the cross-correlated multiple received signals; processing the computed phase for the cross-correlated multiple received signals; windowing and discrete time Fourier transform (DTFT) processing the cross-correlated multiple received signals; computing arg max of a magnitude of the windowed and DTFT processed multiple received signals; summing the computed arg max of the magnitude of the windowed and DTFT processed multiple received signals; and generating the estimate of the Doppler frequency from the summed computed arg max of the magnitude of the windowed and DTFT processed multiple received signals.

Yet another embodiment of the invention is a processor-readable medium containing processor-executable code that, when executed by a processor, causes the processor to implement a method of estimating a Doppler frequency of a received signal corresponding to one or more mobile stations in a communication system, comprising: receiving a signal from one or more mobile stations; differentiating the received signal; correlating the received signal; correlating the differentiated received signal; processing the correlated received signal and the correlated differentiated received signal; and generating the estimate of the Doppler frequency from the processed signals.

DETAILED DESCRIPTION

Figure 1:
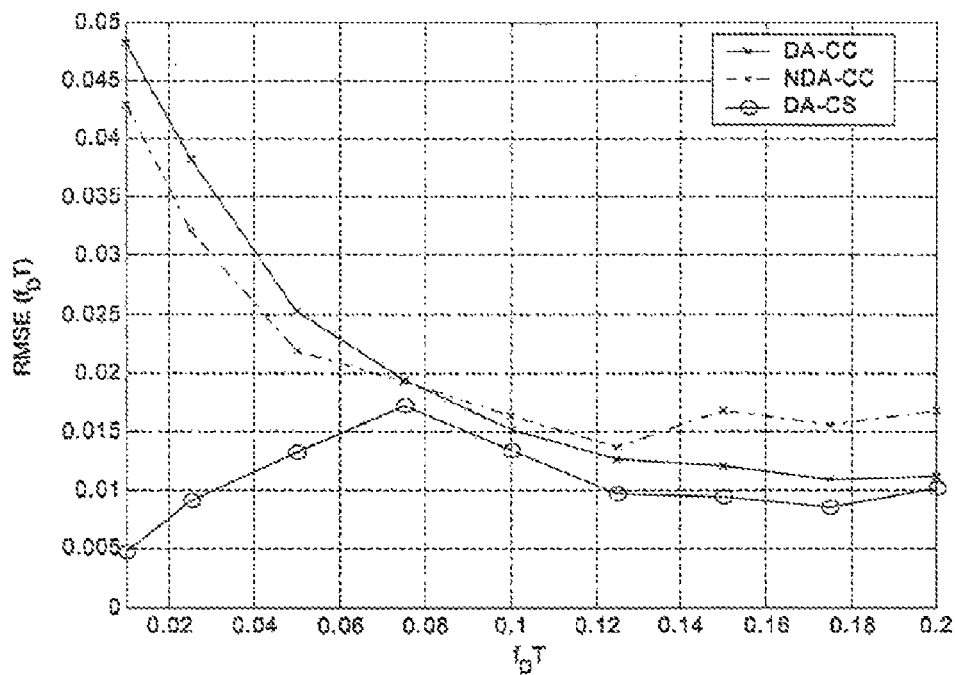
FIG. 1 is an exemplary plot of Root Mean Square Error (RMSE) versus $f_D T$ in isotropic Rayleigh fading with SNR=10 dB.

Various embodiments of the invention may estimate mobile station speed based on a blind cyclostationary estimation technique. This may be implemented in hardware, software, and/or firmware, and/or it may be incorporated into mobile and/or fixed stations of a network.

Embodiments of the invention provide speed estimators that exploit the cyclostationarity of linearly modulated signals. The new estimators can be applied blindly, without using training symbols, which increase the data throughput. On the other hand, for the case where pilot symbols are available, embodiments of the invention are estimators which provide more accurate estimates, compared to blind methods. Essentially, cyclostationary-based estimators are not sensitive to additive stationary noise or interference of any color or distribution, which are known to affect pilot-tone-based approaches. The robustness of the new estimators to non-isotropic scattering and the variations of line-of-sight (LOS) is also investigated. Extensive Monte Carlo simulations are conducted to illustrate the performance of the new estimators.

The following paragraphs provide detailed descriptions of the signal, channel and noise models used in embodiments of the invention. In particular, the received lowpass complex envelope of a linearly modulated signal, transmitted through a frequency-flat fading channel, can be expressed as Equation (1) below:

$$z(t) = h(t)s(t) + v(t), \quad (1)$$

where $s(t) = \Sigma_m w(m)g(t-mT)$, and we have the following definitions w(m)

h(t) fading channel, w(m) stationary random sequence of transmitted symbols chosen from a finite-alphabet complex constellation, g(t) convolution of the transmitter's signaling pulse and the receiver filter which, without loss of generality, is a raised cosine with rolloff factor $\beta \epsilon [0,1]$, v(t) a complex stationary process which represents the summation of noise and interference, independent of h(t) and w(m), T symbol period.

$$z(t) = h(t)s(t) + v(t) \quad (1)$$

where $s(t) = \Sigma_m w(m)g(t-mT)$, and we have the following definitions:

h(t) fading channel, w(m) stationary random sequence of transmitted symbols chosen from a finite-alphabet complex constellation, g(t) convolution of the transmitter's signaling pulse and the receiver filter which, without loss of generality, is a raised cosine with rolloff factor $\beta \epsilon [0,1]$, and v(t) a complex stationary process which represents the summation of noise and interference, independent of h(t) and w(m), T symbol period.

The unit-power fading process h(t) includes the random diffuse component $h_d(t)$ and the deterministic LOS component, as shown in Equation (2) below:

$$h(t) = \sqrt{\frac{1}{K+1}} h^d(t) + \sqrt{\frac{K}{K+1}} e^{-j2\pi f_D t \cos\alpha_0 + j\phi_0}. \quad (2)$$

In Equation (2), $h^d(t)$ is a zero-mean unit-variance stationary complex Gaussian process and the Rician factor K is the ratio of the LOS power to the diffuse power. In the LOS component we have $f_D = v/\lambda = vf_c/c$ as the maximum Doppler frequency in Hz, v is the mobile speed, $\lambda$ is the wavelength, $f_c$ is the carrier frequency, and c is the speed of light. Furthermore, $j^2 = -1$, and $\alpha_0$ and $\phi_0$ stand for the angle-of-arrival (AOA) and the phase of the LOS component at the receiver, respectively.

With von Mises distribution for the AOA, the autocorrelation function of h(t), defined by $r_h(\tau) = E[h(t)h^*(t+\tau)]$, where E[.] and * denote mathematical expectation and complex conjugate, respectively, is given by Equation (3):

$$r_h(\tau) = \frac{K}{K+1} \exp(j2\pi f_D \tau \cos\alpha_0) + \quad (3)$$

$$\frac{1}{K+1} \times \frac{I_0\left(\sqrt{\kappa^2 - 4\pi f_D^2 \tau^2 + j4\pi\kappa f_D \tau \cos\alpha}\right)}{I_0(\kappa)},$$

where $\alpha \epsilon [-\pi, \pi)$ is the mean AOA of the diffuse component, $\kappa \geq 0$ controls the width of the diffuse component AOA, and $I_0(.)$ is the zero-order modified Bessel function of the first kind. Equation (3) is an empirically-verified extension of the well-known Clarkes' model.

The following paragraphs provide detailed descriptions of the cyclostationarity of the received signal used in embodiments of the invention. In particular, the time-varying autocorrelation of the received signal z(t), defined by $r_z(t;\tau) = r_z(t,u) = E[z(t)z^*(u)]$ with $u = t+\tau$, can be shown in Equation (4) to be $$r_z(t;\tau) = r_h(\tau)r_s(t;\tau) + r_v(\tau), \quad (4)$$

where $$r_s(t;\tau) = \sum_m \sum_n \tilde{r}_w(n-m)g(t-mT)g*(t+\tau-nT), \quad (5)$$

in which $\tilde{r}_w(n-m) = E\{w(m)w^*(n)\}$. It is well known that s(t) is a cyclostationary random process since $r_s(t;\tau)$ is periodic in t, with period T. Consequently we have $r_z(t+kT;\tau) = r_z(t;\tau)$, $\forall$ t,$\tau$, which indicates that z(t) is cyclostationary as well, with the same period T.

The cyclic correlations which are the Fourier coefficients of $r_z(t;\tau)$ for cyclic frequencies $k/T = 0, \pm 1/T, \pm 2/T, \ldots$, are given by Equation (6)

$$R_z(k;\tau) = \frac{1}{T}\int_0^T r_z(t;\tau)\exp\{-j2\pi kt/T\}dt \quad (6)$$

$$= r_h(\tau)R_s(k;\tau) + r_v(\tau)\delta_k,$$

where $\delta_k$ is the Kronecker delta function, which is 1 when k=0 and 0 otherwise. Furthermore, $R_s(k;\tau)$ is cyclic correlation of s(t), which is the inverse Fourier transform of s(t)'s cyclic spectrum $\Omega_s(k;f)$, given by Equation (7)

$$\Omega_s(k;f) = \frac{1}{T}G(f)G*\left(f - \frac{k}{T}\right)\tilde{\Omega}_w(f), \quad (7)$$

where G(f) is the Fourier transform of g(t) and $\tilde{\Omega}_w(f)$ is the power spectrum of the sequence of transmitted symbols {w(m)}, which is also the Fourier transform of $\tilde{r}_w(n-m)$ The following paragraphs provide detailed descriptions of the cyclostationary-based estimators used in embodiments of the invention. In particular, for an arbitrary proper complex process $z(t)$, it is known that $r_{\dot z}(t;\tau) = r_{\dot z}(t,u) = -\partial^2 r_z(t;u)/\partial t \partial u$, where dot denotes differentiation with respect to time $t$. According to Equation (4) we have $$r_{\dot z}(t; \tau) = \qquad (8)$$
$$r_h(\tau)r_{\dot s}(t; \tau) + r_{\dot h \dot h}(\tau)r_{ss}(t; \tau) + r_{\dot h h}(\tau)r_{s \dot s}(t; \tau) + r_h(\tau)r_{\dot s}(t; \tau) + r_v(\tau),$$

where $$r_{\dot h \dot h}(\tau) = E\{\dot h(t)\dot h^*(t+\tau)\}, \; r_{\dot h h}(\tau) = E\{\dot h(t) h*(t+\tau)\},$$
$$r_{\dot s \dot s}(t; \tau) = E\{\dot s(t)\dot s*(t+\tau)\}, \; r_{s \dot s}(t; \tau) = E\{\dot s(t) s*(t+\tau)\}, \text{ and} \qquad (9)$$
$$r_{\dot s}(t, \tau) = \sum_m \sum_n \tilde r_w(n-m) \dot g(t-mT) \dot g*(t+\tau-nT).$$

It is easy to show that $r_{\dot s \dot s}(t;\tau)$, $r_{s \dot s}(t;\tau)$ and $r_{\dot s}(t,\tau)$ are periodic w.r.t. t with period T. Therefore $\dot z(t)$ is cyclostationary as well, with the same period T. With the assumption of isotropic scattering and no LOS, i.e., $r_h(\tau) = J_0(2\pi f_D \tau)$ where $J_0(.)$ is the zero-order Bessel function of the first kind, one obtains $r_{\dot h h}(0) = r_{h \dot h}(0) = 0$ and $r_{\dot h}(0) = -r_h(\tau)|_{\Sigma=0} = 2\pi^2 f_D^2$, where prime denotes differentiation with respect to $\tau$. Therefore, the cyclic correlation of $\dot z(t)$ at $\tau=0$ can be obtained by calculating the k-th Fourier coefficients of Equation (8) w.r.t. t is:

$$R_{\dot z}(k;0) = 2\pi^2 f_D^2 R_s(k;0) + R_{\dot s}(k;0) + r(0)\delta_k, \qquad (10)$$

where $R_s(k; 0)$ and $R_{\dot s}(k; 0)$ are the k-th Fourier coefficients of Equation (5) and Equation (9), respectively. To obtain a noise free estimator for $f_D$, we choose $k \neq 0$ and divide $R_{\dot z}(k;0)$ in (10) by $R_z(k;0)$ in (6), which after rearranging the terms gives us $$f_D^2 = \frac{1}{2\pi^2}\left(\frac{R_{\dot z}(k;0)}{R_z(k;0)} - \frac{R_{\dot s}(k;0)}{R_s(k;0)}\right), k \neq 0. \qquad (11)$$

The cyclic correlations of $z(t)$ can be estimated from the discrete-time-version signal of $z(t)$, oversampled at a rate of P/T and represented by $\{z[n]\}_{n=0}^{N-1}$ in Equation (12) as:

$$\hat R_z(k; P\tau_d/T) = \frac{1}{\sqrt N} \sum_{n=0}^{N-\tau_d-1} z[n]z*[n+\tau_d]e^{-j2\pi kn/P}, \qquad (12)$$

where $\tau_d = 0, 1, 2, \ldots, N-1$. To estimate the cyclic correlations of $\dot z(t)$, first $\dot z(t)$ can be estimated from the oversampled version of $z(t)$ via finite difference approximations, which yields $\{\dot z[n]\}_{n=0}^{N-1}$. Then, similar to Equation (12) we have in Equation (13):

$$\hat R_{\dot z}(k; P\tau_d/T) = \frac{1}{\sqrt N} \sum_{n=0}^{N-\tau_d-1} \dot z[n]\dot z*[n+\tau_d]e^{-j2\pi kn/P}. \qquad (13)$$

Note that $R_s(k;0)$ and $R_{\dot s}(k;0)$ in Equation (11) depend on the statistics of the symbols $\{w(m)\}$, as well as the pulse shape.

Assuming the transmitted data symbol sequence $\{w(m)\}$ is white and zero-mean, Equation (7) simplifies to:

$$\Omega_s(k; f) = \frac{\sigma_w^2}{T} G(f) G*\left(f - \frac{k}{T}\right), \qquad (14)$$

where $\sigma_w^2 = E[|w(m)|^2]$ is the average power of the sequence. It is easy to see that $\Omega_s(k;f) = 0$, $\forall |k| \geq 2$, when $g(t)$ is a raised cosine. By taking the inverse Fourier transform of Equation (14), one can show that $$R_s(k; \tau) = \frac{\sigma_w^2}{T} e^{j\pi k\tau/T} \int_{-\infty}^{\infty} G\left(f + \frac{k}{2T}\right) \times G*\left(f - \frac{k}{2T}\right)e^{-j2\pi f\tau}df, \qquad (15)$$

which results in $$R_s(1; \tau) = \frac{\sigma_w^2 T}{4} e^{j\pi\tau/T} \int_{-\beta/(2T)}^{\beta/(2T)} \cos^2\left(\frac{\pi fT}{\beta}\right) e^{-j2\pi f\tau}df \qquad (16)$$
$$= \frac{\sigma_w^2 T^3 \sin(\pi\beta\tau/T)}{8\pi(T^2\tau - \beta^2\tau^3)} e^{j\pi\tau/T}.$$

Based on Equation (9) and Equation (14), we have:

$$\Omega_{\dot s}(k;f) = \sigma_w^2 T^{-1} \check G*(f) \check G*(f-k/T),$$

where $\check G(f) = j2\pi f G(f)$. Similar to Equation (15), one obtains Equation (17) as:

$$R_{\dot s}(k; \tau) = \frac{\sigma_w^2}{T} e^{j\pi k\tau/T} \int_{-\infty}^{\infty} \check G\left(f + \frac{k}{2T}\right) \times \check G*\left(f - \frac{k}{2T}\right)e^{-j2\pi f\tau}df, \qquad (17)$$

which gives us Equation (18) as:

$$R_{\dot s}(1; \tau) = \int_{-\beta/(2T)}^{\beta/(2T)} \left(f^2 - \frac{1}{4T^2}\right)\cos^2\left(\frac{\pi fT}{\beta}\right)e^{-j2\pi f\tau}df \times \sigma_w^2 T \pi^2 e^{j\pi\tau/T}. \qquad (18)$$

By substituting Equation (16) and Equation (18) into Equation (11), the blind speed estimator can be written in Equation (19) as:

$$\hat f_D = \frac{1}{\sqrt 2 \pi}\sqrt{\frac{\hat R_{\dot z}(1;0)}{\hat R_z(1;0)} - \frac{R_{\dot s}(1;0)}{R_s(1;0)}}, \qquad (19)$$

where $$\frac{R_{\dot s}(1;0)}{R_s(1;0)} = \frac{(\pi^2-6)\beta^2 - 3\pi^2}{3T^2}, \qquad (20)$$

obtained from Equation (16) and Equation (18).

If instead we choose the fixed training sequence $w(m) = (-1)^m \sigma_w$, then it can be shown in Equation (21) and Equation (22) that for the Data-Aided Speed Estimator:

$$R_s(1;\tau) = \frac{\sigma_w^2 T}{4}\exp\{j\pi\tau/T\}, \qquad (21)$$

$$R_{\dot s}(1;\tau) = -\frac{\pi^2 \sigma_w^2}{4T}\exp\{j\pi\tau/T\}, \qquad (22)$$

which interestingly do not depend on the rolloff factor β. Following the same approach that resulted in Equation (19) and Equation (20), the data-aided speed estimator can be derived in Equation (23) as:

$$\hat{f}_D = \frac{1}{\sqrt{2}\pi}\sqrt{\frac{\hat{R}_z(1;0)}{\hat{R}_z(1;0)} + \frac{\pi^2}{T^2}}. \quad (23)$$

By taking the Fourier transform of Equation (6) w.r.t. τ, for k≠0, we obtain in Equation (24):

$$\Omega_z(k;f) = \Omega_h(f) \otimes \Omega_s(k;f), k \neq 0 \quad (24)$$

where ⊗ denotes convolution. Note that by choosing k≠0, the effect of noise is disappeared. Now the idea is to obtain $f_D$ from the estimate of $\Omega_z(k;f)$. The consistent cyclic spectrum estimate can be obtained by windowing $\hat{R}_z(k;P\tau_d/T)$ in Equation (12) with the window $W^{(2L_g+1)}(\tau_d)$, defined over $[-L_g, L_g]$ and gives Equation (25) as:

$$\hat{\Omega}_z(k; Pf_d/T) = \frac{T}{P}\sum_{\tau_d=-L_g}^{L_g} W^{(2L_g+1)}(\tau_d)\hat{R}_z(k; P\tau_d/T) \times \exp\{-j2\pi f_d\tau_d\}. \quad (25)$$

For the Data-Aided Speed Estimator, based on Equation (21), $\Omega_s(1;f)$ is an impulse at f=1/(2T). Therefore $\Omega_z(1;f)$ is simply the Doppler spectrum $\Omega_h(f)$ shifted from f=0 to f=1/(2T). Hence, we can use the same technique to estimate $f_D$ i.e., as shown in Equation (26):

$$\hat{f}_D = \frac{P}{T}\left|-\frac{1}{2T} + \arg f\max\left|\hat{\Omega}_z(1;f)\right|\right|. \quad (26)$$

In this section, embodiments of the invention are extended to a system for a multi-antenna cyclostationary-based estimator to improve the performance. Consider a uniform linear antenna array at an elevated base station (BS) of a marcocell, composed of L omnidirectional unit-gain elements, with element spacing d. The BS experiences no local scattering, whereas the single-antenna mobile station (MS) is surrounded by local scatters. Let the received signals at the l-th element be: $z_l(t) = h_l(t)s(t) + v_l(t)$, l=1, 2, . . . , L, which is similar to Equation (1).

Then the time-varying space-time crosscorrelation function between $Z_a(t)$ and $z_b(t)$, 1≤a≤b≤L, defined by $r_z((b-a)\Delta,(t;\tau)) = E[z_a(t)z_b^*(t+\tau)]$ such that Δ=d/λ, is given in Equation (27) as:

$$r_z((b-a)\Delta,(t;\tau)) = r_h((b-a)\Delta,\tau)r_s(t;\tau) + r_v(\tau)\delta_{b-a}, \quad (27)$$

where the space-time channel crosscorrelation, defined by:

$$r_h((b-a)\Delta,\tau) = E[h_a(t)h_b^*(t+\tau)],$$

is given in Equation (28) as:

$$r_h((b-a)\Delta,\tau) = \frac{K}{K+1}\exp(j(\zeta+\tilde{n})\cos\alpha_0) + \frac{1}{K+1} \times \frac{I_0\left(\sqrt{\kappa^2 - \zeta^2 - \tilde{n}^2 - 2\zeta\tilde{n} + j2\kappa(\zeta+\tilde{n})\cos\alpha}\right)}{I_0(\kappa)}, \quad (28)$$

where $\zeta=2\pi f_D\tau$, and $\tilde{n}=2\pi(a-b)\Delta$. We assume the same Rician factor K and unit channel power $E[|h_l(t)|^2]=1$ at each element. Noise components are independent at different elements, with the same power $\sigma_v^2$. The angle spread at the BS is generally small for macrocells in urban, suburban, and rural areas, most often less than 30°, which corresponds to κ≥14.6. For such scenarios, the spatial channel cross-correlation function $r_h((b-a)\Delta, 0) = E[h_a(t)h_b^*(t)]$, 1≤a≤b≤L, can be accurately approximated in Equation (29) by:

$$r_h((b-a)\Delta, 0) \approx \left\{\frac{e^{-\frac{\tilde{n}^2\sin^2\alpha}{2\kappa}}}{K+1} + \frac{K}{K+1}\right\}e^{j\tilde{n}\cos\alpha}. \quad (29)$$

Note that in Equation (29), $\alpha_0 = \alpha$ is assumed, due to the small angle spread at the BS. With τ=0 and a≠b in Equation (27), the time-varying spatial cross-correlation function in Equation (27) can be written in Equation (30) as:

$$r_z((b-a)\Delta,(t;0)) = r_h((b-a)\Delta,0)r_s(t;0), \quad (30)$$

where $r_h((b-a)\Delta, 0)$ for macrocells is given in (29) and $r_s(t; 0)$ can be obtained from Equation (5). Since noise components of different elements are independent, the effect of noise has not shown up in Equation (30) as a≠b. As we will see later in Equation (31), cos α can be estimated by looking at the phase of $r_z((b-a)\Delta, (t;0))$ in Equation (30), due to the special form of $r_h((b-a)\Delta, 0)$ in Equation (29) and also because $r_s(t; 0)$ in Equation (30) is real and positive.

When the BS experiences such heavy nonisotropic scattering κ≥14.6, it is straightforward to verify that there is a strong peak in the power spectrum of each branch $\Omega_{h_l}(f)$, at $f_D\cos\alpha$, even when there is no LOS. On the other hand, based on Equation (14), it can be shown that $\Omega_s(1;f)$, for a zero-mean i.i.d. sequence {w(m)}, is a uni-modal spectrum centered at f=1/(2T), with a bandwidth of β/T. In addition, for the training sequence $w(m)=(-1)^m\sigma_w$, one can see from Equation (21) that $\Omega_{h_l}(f)$ is an impulse at f=1/(2T) as well. Therefore, according to Equation (24) and due to the impulsive shape of $\Omega_{h_l}(f)$ when κ is large, we conclude that the peak of $\Omega_{z_l}(1;f)$ for each branch happens at $f=f_D\cos\alpha+1/(2T)$. Now relying upon both cyclic spectrum and the spatial information provided by multiple antennas, we propose the following space-time estimator.

Based on Equation (30), we can estimate cos α via $$\hat{\cos}\alpha \approx \angle \hat{R}_z(\Delta,(0;0))/(-2\pi\Delta), \quad (31)$$

where ∠ denotes the phase of a complex number and $\hat{R}_z(\Delta, (0; 0))$ is the estimate of $$R_z(\Delta,(k;0)) = T^{-1}\int_0^T r_z(\Delta,(t;0))\exp\{-j2\pi kt/T\}dt$$

with k=0 and $r_z(\Delta, (t; 0)) = E[z_a(t)Z_{a+1}^*(t)]$, ∀a∈[1, L-1]. We also have $$\hat{R}_z(\Delta,(0;0)) = (L-1)^{-1}\sum_{l=1}^{L-1}\hat{R}_z^l(\Delta,(0;0))$$

-continued where $$\hat{R}_z^l(\Delta, (0;0)) = N^{-1/2} \sum_{n=0}^{N-1} z_l(n) z_{l+1}^*(n),$$

$$l \in [1, L-1],$$

is the l-th adjacent-antenna-pair estimate of $R_z(\Delta, (0;0))$. It is worth emphasizing that if noise components $v_l(t)$, l=1, 2, ..., L are spatially correlated, we need replace $\hat{R}_z(\Delta, (0;0))$ in (31) with $\hat{R}_z(\Delta, (1;0))$ in order to have a noise-free estimate of côs α. Finally, $f_D$ can be estimated via Equation (32) as:

$$\hat{f}_D = \frac{P}{\cos\alpha LT} \sum_{l=1}^{L} \left| -\frac{1}{2T} + \arg f \max \left| \hat{\Omega}_{z_l}(1;f) \right| \right|, \quad (32)$$

where $\hat{\Omega}_{z_l}(1;f)$ can be obtained via Equation (25). Note that the cyclic-spectrum-based estimator in Equation (32) can be applied either blindly or with the aid of the training sequence $w(m)=(-1)^m \sigma_w$.

In this section, we first evaluate the performance of the proposed single antenna estimators using Monte Carlo simulation and next investigate the effect of noise, nonisotropic scattering, and LOS. Then we present the performance of our space-time estimator. The fading channel is generated using a spectral method from the background art. The bandlimited Gaussian noise v(t), with the autocorrelation $\sigma_v^2 g(\tau)$, is simulated via the same method. It is worth noting that our algorithm does not put any constraint on the distribution of both the fading process and the noise, although only for simulation purposes we generate them as complex Gaussian processes. We define signal-to-noise ratio SNR=$\sigma_w^2 = \sigma_v^2$. The performance of the estimator is measured by using the root mean squared error (RMSE) criterion $E\{[(f_D - \hat{f}_D)^2]\}^{1/2}$.

In all the simulations we have, the roll-off factor β=0.5, oversampling rate P=8, and the symbol duration T=0:001 second. Each data-aided estimation uses M=256 symbols and 200 Monte Carlo simulations, whereas blind algorithms use M=512 4-QAM i.i.d. symbols 400 Monte Carlo simulations. The abbreviations DA, NDA, CC, and CS in the figures refer to data aided, non-data aided (blind), cyclic correlation, and cyclic spectrum, respectively. For example, DA-CC in a legend box represents a data-aided cyclic correlation based speed estimator.

Figure 2:
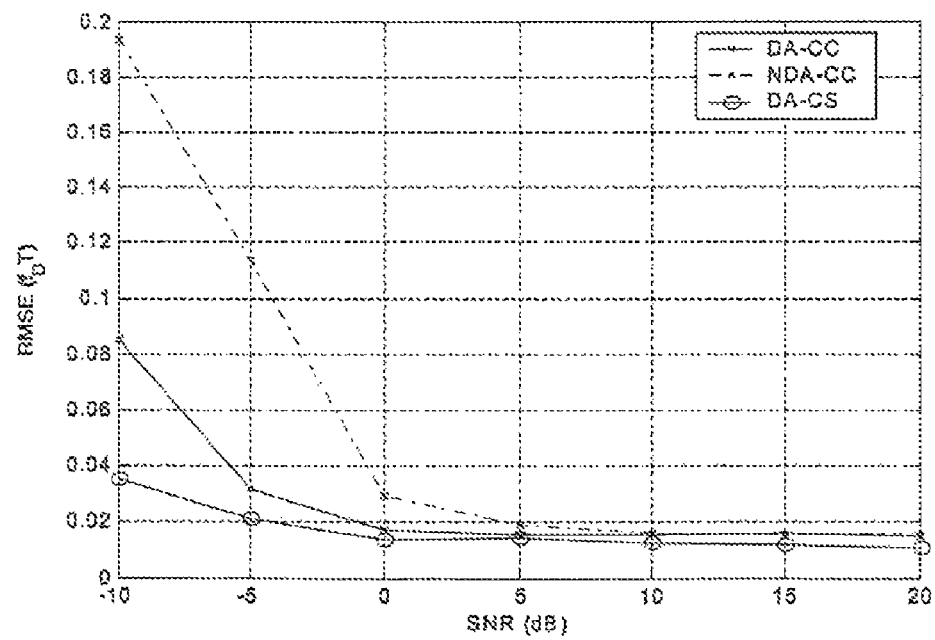
FIG. 2 is an exemplary plot of Root Mean Square Error (RMSE) versus $f_D T$, where $f_D T=0.1$ in isotropic Rayleigh fading.
Figure 3:
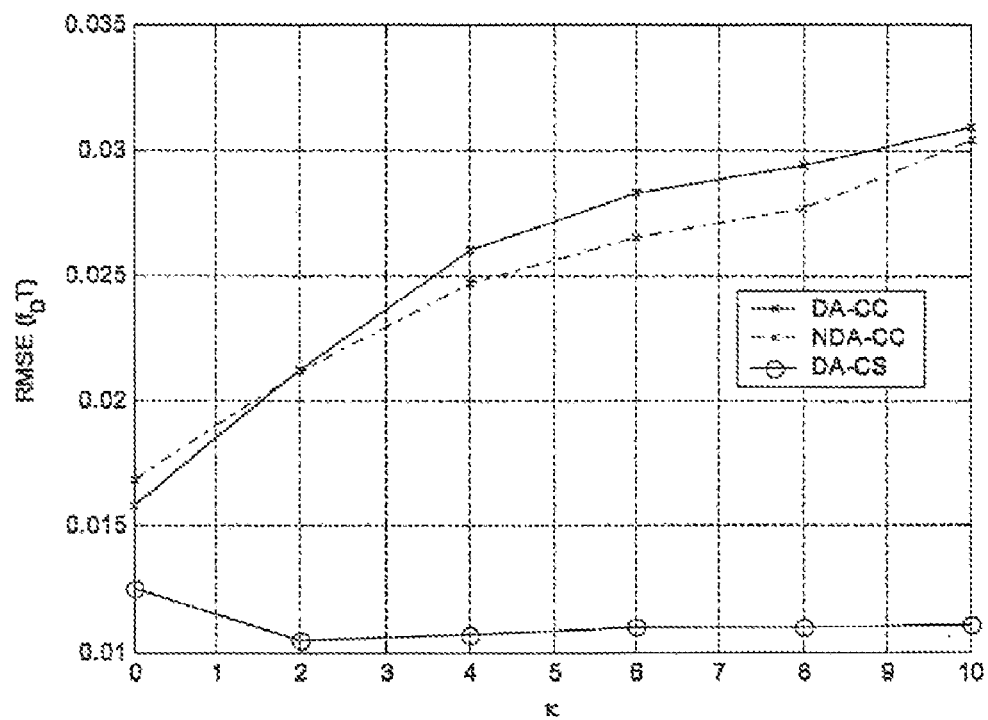
FIG. 3 is an exemplary plot of Root Mean Square Error (RMSE) versus nonisotropic scattering parameter $\kappa$ in Rayleigh fading where $f_D T=0.1$, SNR=10 dB and $\alpha=30°$.
Figure 4:
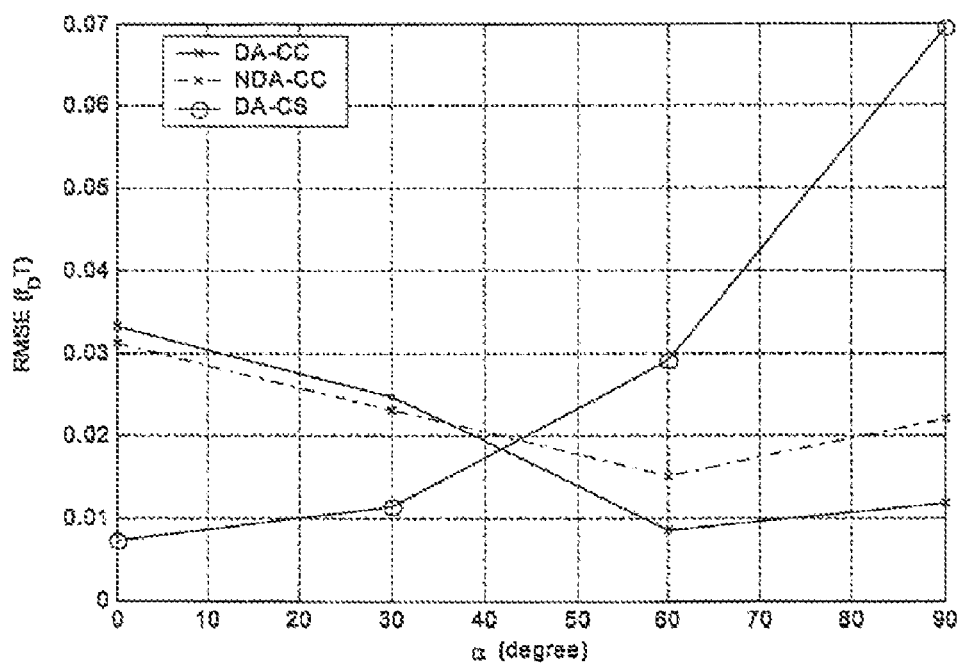
FIG. 4 is an exemplary plot of Root Mean Square Error (RMSE) versus mean AOA $\alpha$ in Rayleigh fading where $f_D T=0.1$, SNR=10 dB and $\kappa=3.3$.
Figure 5:
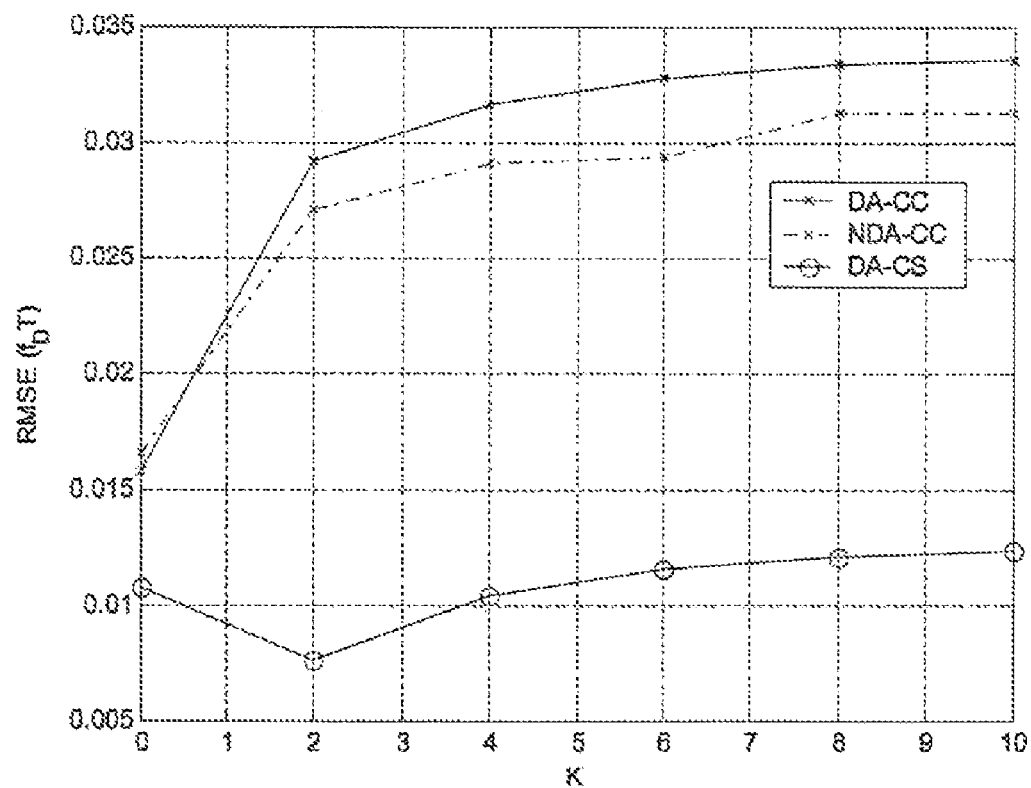
FIG. 5 is an exemplary plot of Root Mean Square Error (RMSE) versus Rician factor K in Rician isotropic fading where $f_D T=0.1$, SNR=10 dB and $\alpha_0=30°$.
Figure 6:
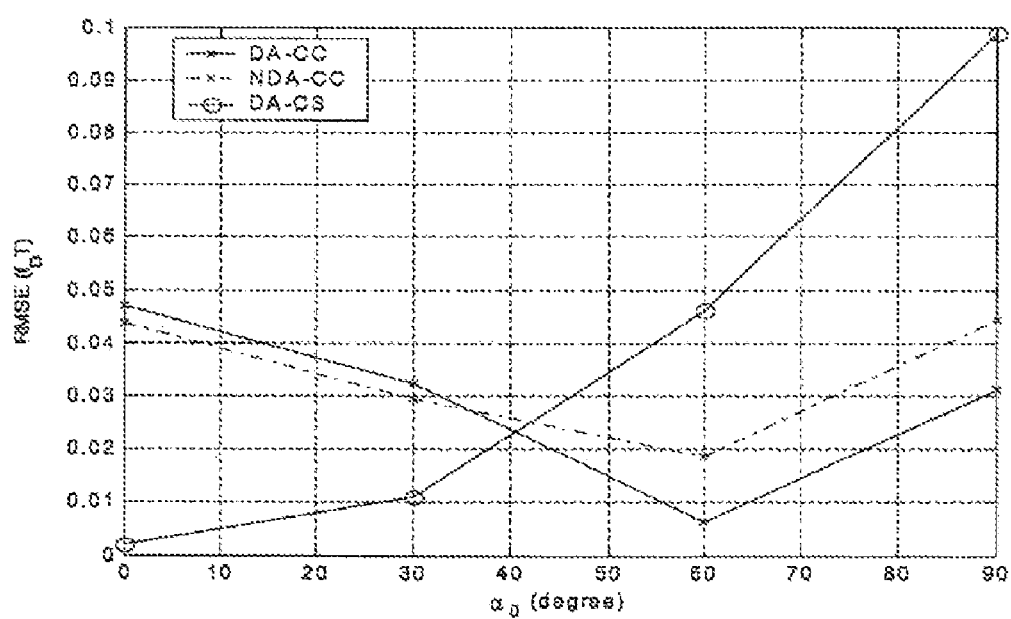
FIG. 6 is an exemplary plot of Root Mean Square Error (RMSE) versus LOS AOA $\alpha_0=30°$ in Rician isotropic fading where $f_D T=0.1$, SNR=10 dB and K=5.

We first investigate the performance of single antenna estimators, illustrated from FIG. 1-FIG. 6. FIG. 1 shows the performance of three estimators DA-CC, NDA-CC, and DACS when the channel is isotropic, κ=0, Rayleigh fading with SNR=10 dB. Obviously, the DA-CS is the best, and DA-CC and NDA-CC have comparable estimation errors at small Dopplers, while DA-CC performs better than NDA-CC at large Dopplers. The robustness of these estimators against noise is shown in FIG. 2 in isotropic Rayleigh fading, for a fixed $f_D T=0.1$. Again, the DA-CS exhibits the best performance. FIG. 3 and FIG. 4 demonstrate the effect of nonisotropic scattering parameters κ and $\alpha_0$. As one can see, the CS-based method is less sensitive to than the CC-based techniques but more sensitive to α. Based on FIG. 5 and FIG. 6, we have similar observation regarding the effect of the LOS parameters K and $\alpha_0$. Note that for all the curves in FIG. 3-FIG. 6, we have $f_D T=0.1$ and SNR=10 dB.

Now we evaluate the performance of the space-time CS-based estimator in Equation (32). In the simulation, L=4 spacetime correlated complex Gaussian processes for the macrocell scattering scenario of K=0, K=100, and α=60° are generated, with Δ=½. For each branch, the noise power is the same as the single antenna case, with SNR=10 dB per branch.

Figure 7:
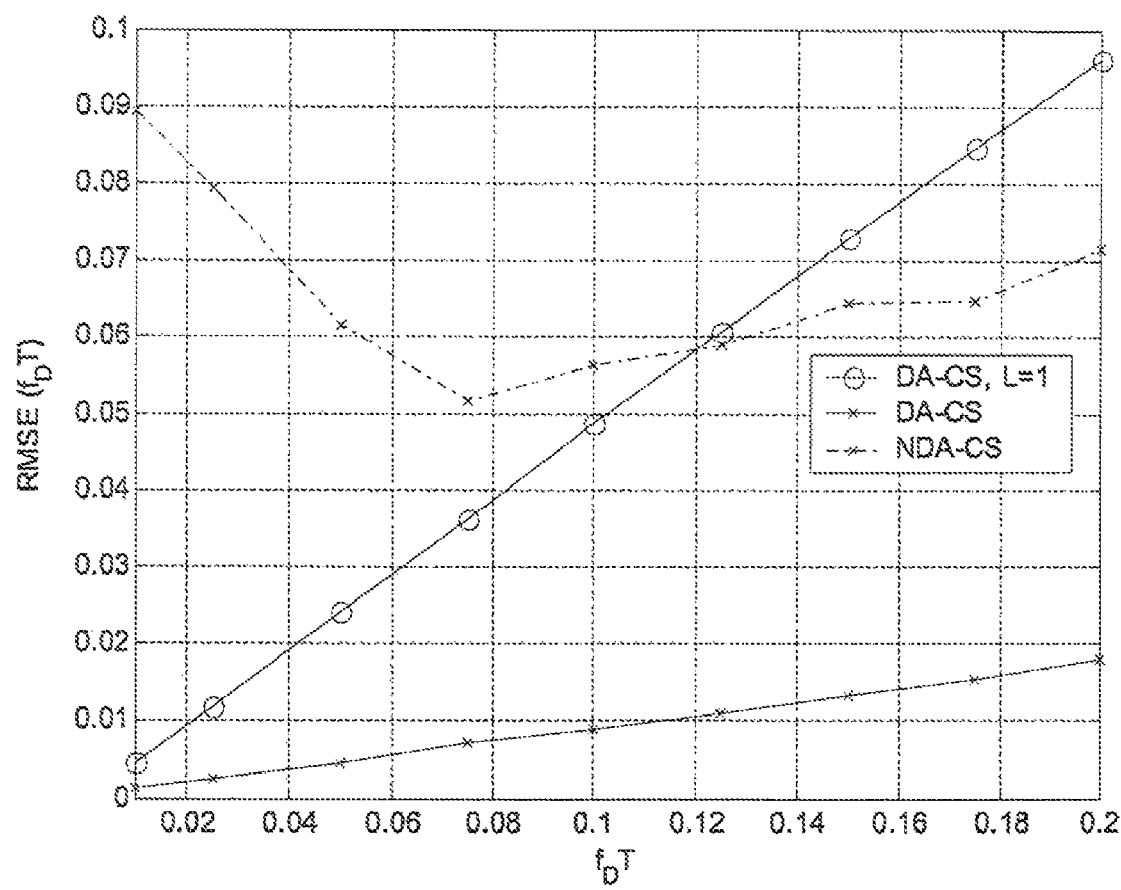
FIG. 7 is an exemplary plot of Root Mean Square Error (RMSE) versus $f_D T$ in Rayleigh fading where $f_D T=0.1$, SNR=10 dB, $\kappa=100$, L=4, $\Delta=\frac{1}{2}$ and $\alpha=60°$.

FIG. 7 illustrates the estimation error, for both DA and NDA approaches. As we see, the DA-CS method provides excellent performance over a wide range of Dopplers. The curve for the DA-CS method for L=1 is also shown in FIG. 7, which clearly shows the advantage of using more than one antenna. Apparently, the presence of LOS will further improve the performance.

Figure 8:
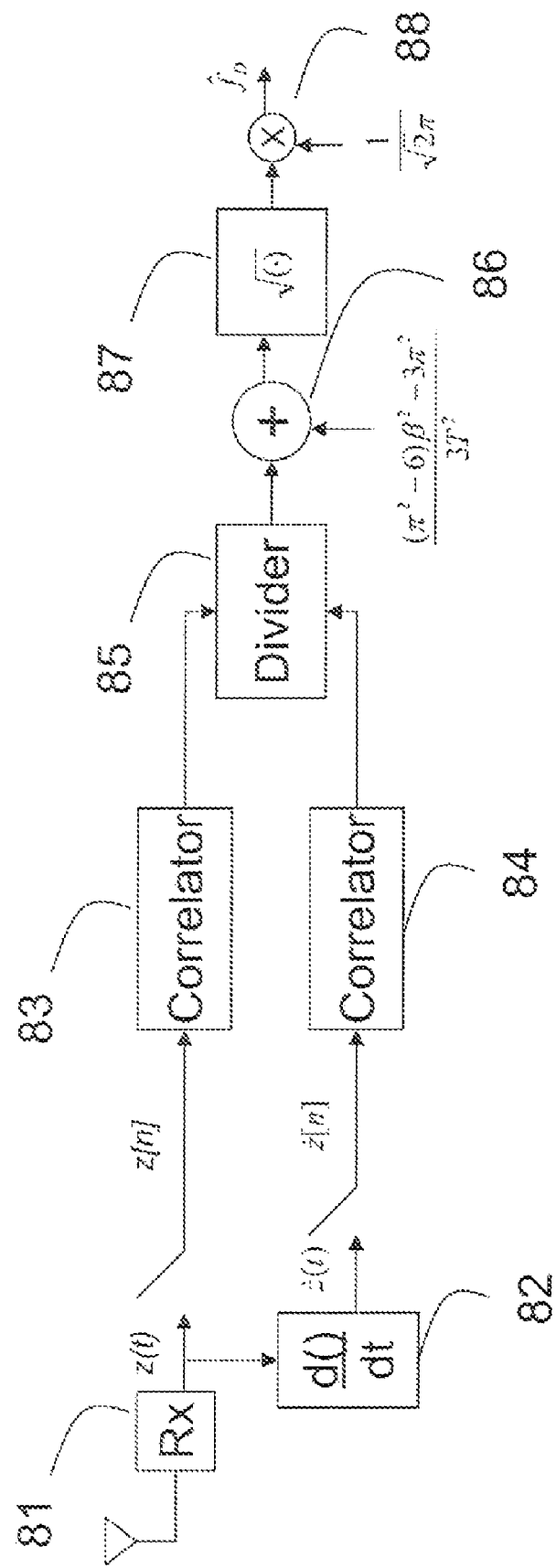
FIG. 8 shows an exemplary conceptual block diagram corresponding to an embodiment of the invention.

FIG. 8 shows an exemplary conceptual block diagram corresponding to an embodiment of the invention. In particular, FIG. 8 discloses an antenna providing a receiver 81 that outputs a received time-domain signal z(t). The received time-domain signal z(t) is fed to a differentiator 82 that outputs a differentiated version of the received time domain signal ż(t). As shown in FIG. 8, both z(t) and ż(t) are sampled to produce z[n] and ż[n], respectively. The sampled versions of the signals z[n] and ż[n] are fed to correlator 83 and correlator 84, respectively. The outputs of the correlators 83, 84 are fed to a divider 85 and the output of the divider 85 is fed to a summer 86 where an additional factor is added to the result. A square root function 87 is applied to the output of the summer 85 and the result is fed to a multiplier 88 where an additional factor is applied. The output of the multiplier provides an estimate of the Doppler frequency, $\hat{f}_D$, using the technique suggested by Equation (23) above. Note that the receivers in this FIG. 8, as well as those shown in FIG. 9A and FIG. 9B, may be used to obtain low-pass complex envelopes of received signals.

Figure 9A:
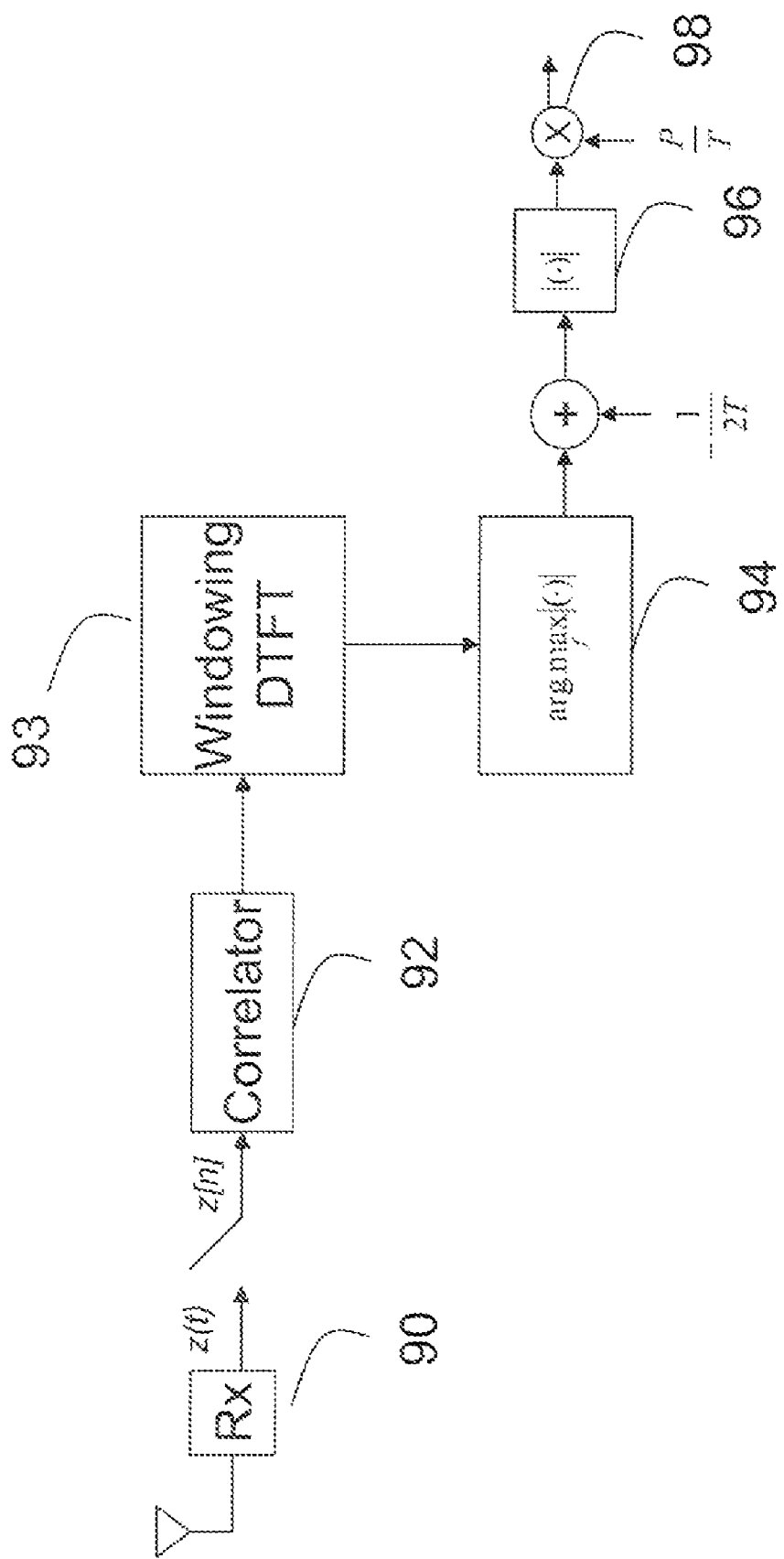
FIG. 9A shows an exemplary conceptual block diagram corresponding to a portion of another embodiment of the invention.

FIG. 9A shows an exemplary conceptual block diagram corresponding to a portion of another embodiment of the invention. In particular, FIG. 9A discloses In particular, an antenna providing a receiver 90 that outputs a received time-domain signal z(t). The received time-domain signal z(t) is sampled to produce z[n] which is fed to correlator 92. The outputs of the correlator 92 is fed to a Windowing discrete time Fourier transform (DTFT) 93. The maximum value of the magnitude of the Windowing DTFT 93 is determined by the function block 94. The output of function block 94 is fed to a summer 86 where a factor (e.g., ½T) is added to the result. A magnitude function block 96 is applied to the output of the summer and the result is fed to a multiplier 98 where an additional factor (e.g., P/T) is applied. This portion of the embodiment may be used to compute individual components of an estimator, where the individual components correspond to signals received by multiple antennas.

Figure 9B:
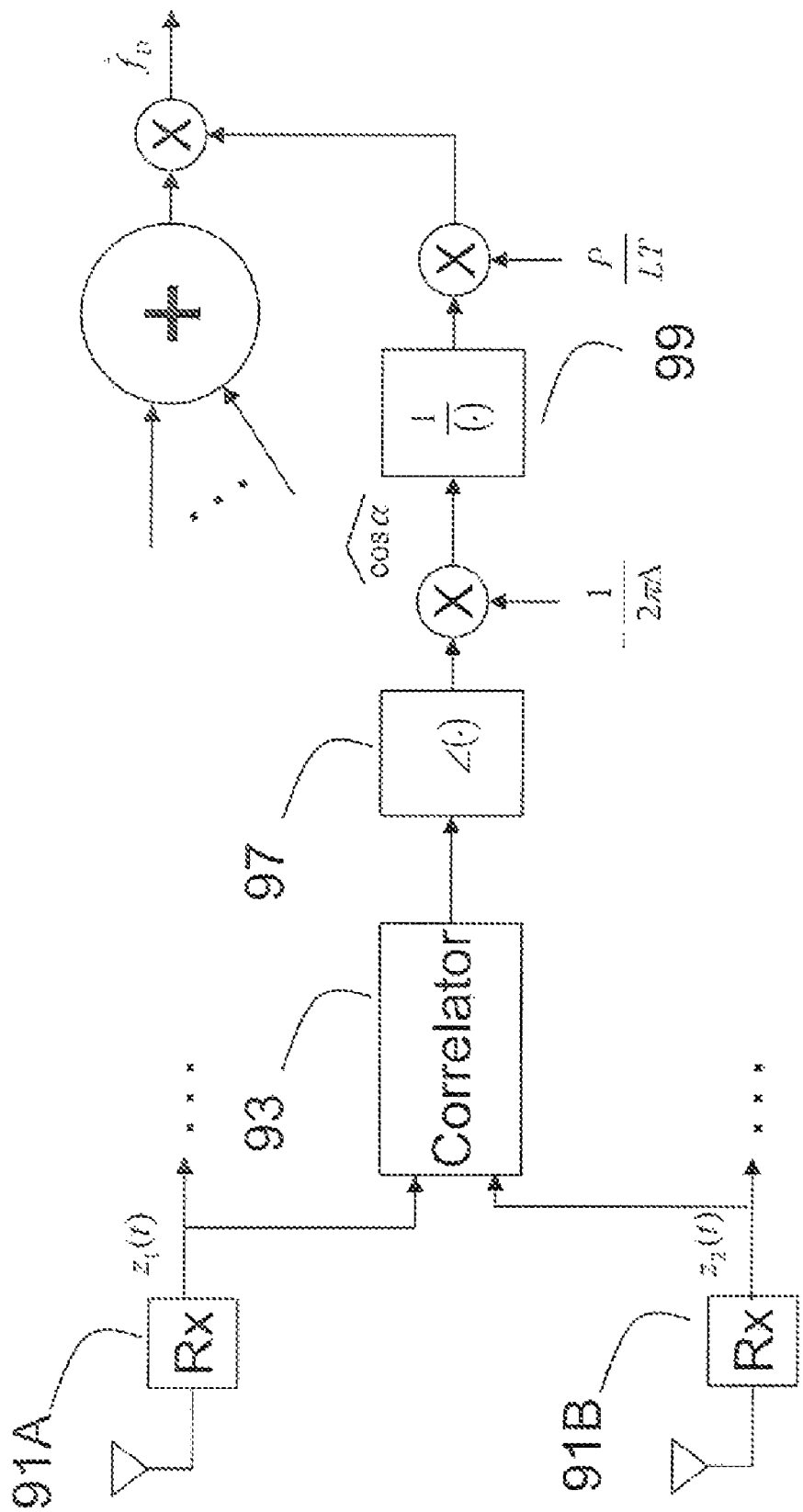
FIG. 9B shows an exemplary conceptual block diagram that may incorporate the block diagram shown in FIG. 9A.

FIG. 9B shows an exemplary conceptual block diagram that may incorporate the block diagram shown in FIG. 9A. As noted above, multiple antennas may be used to provide an estimate of the Doppler frequency, $\hat{f}_D$. As an example, FIG. 9B shows two antennas feeding two receivers 91A, 91B. However, the invention is not thus limited. In this embodiment, which may be used to compute the estimate as suggested by Equation (32), each individual signal (or low-pass complex envelope) may pass through an apparatus that may compute individual components, as described in Equation (25), and which may be implemented, for example, as in FIG. 9A.

Additionally, at least two of the signals ($z_1(t)$ and $z_2(t)$ as shown in FIG. 9B (but the invention is not thus limited) may be pairwise correlated in correlator 93 and further processed (i.e., by phase angle function 97, inversion function 99, multipliers and adders) to obtain an estimate of a factor for a multiplier used to multiply a sum of individual components that may be computed using the apparatus of FIG. 9A to obtain an estimate of the Doppler frequency, $\hat{f}_D$.

Figure 10:
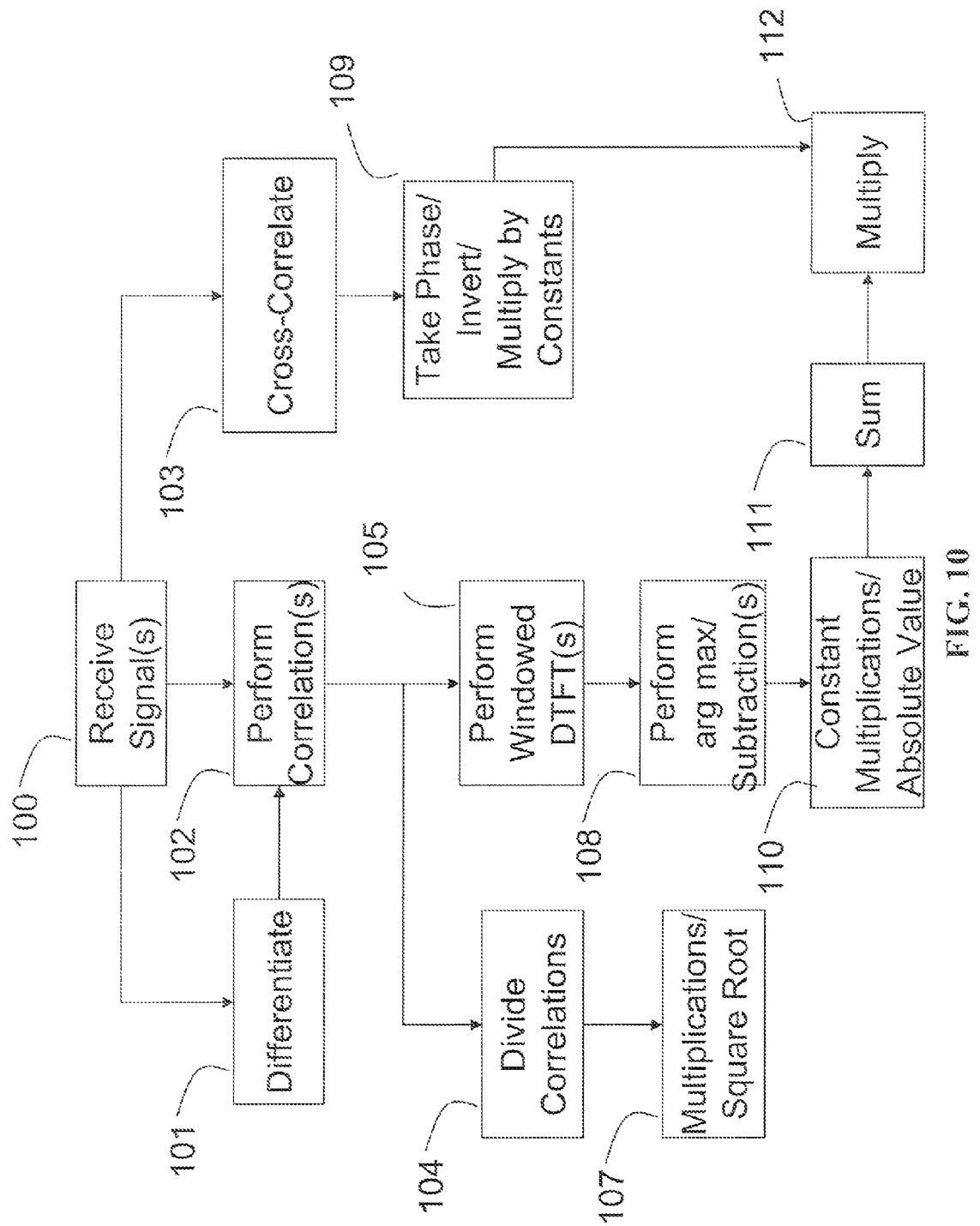
FIG. 10 shows an exemplary flowchart that incorporates methods that may be used to implement various embodiments of the invention.

FIG. 10 shows an exemplary flowchart that incorporates the various methods indicated by the equations discussed above. The following paragraphs discuss how the various methods of FIG. 10 may be combined to produce to implement the embodiments of the invention shown in FIGS. 8, 9A and 9B. Moreover, most of the various methods shown in FIG. 10 may be implemented via a processor-readable medium containing processor-executable code that, when executed by a processor, causes the processor to implement the various methods.

In a non-limiting example, the conceptual block diagram of FIG. 8 can be implemented by the following method steps shown in FIG. 10. In step 100 of FIG. 10, a signal(s) is received at the receiver 81 of FIG. 8. The received signal(s) is differentiated in step 101 and correlators 83, 84 perform correlations on sampled versions of both the received signal and the differentiated received signal in step 102. The two correlations of the received signal and the differentiated received signal are fed to a divider 85 in step 104. In step 107 of FIG. 10: (1) a sum value is computed by adding a factor to the divided correlations; (2) a square root 87 of the sum value is computed and the resulting square root is multiplied 88 by an additional factor in order to generate an estimate of the Doppler frequency $\hat{f}_D$.

In another non-limiting example, the conceptual block diagram of FIG. 9A can be implemented by the following method steps shown in FIG. 10. In step 100 of FIG. 10, a signal(s) is received at receiver 90 of FIG. 9A. The received signal is sampled and correlations are performed by correlator 92 on the sampled version of the received signal in step 102. A windowed, discrete time Fourier transform (DTFT) is performed on the correlated signal at step 105. Step 108 computes an output that is the argument of the maximum of the magnitude of the windowed DTFT. In step 110 of FIG. 10: (1) a sum value is computed by adding a factor to the output in a summing function; (2) a magnitude value is computed by a magnitude function 96; and the resulting magnitude value is multiplied by a second factor in a multiplier 98.

In yet another non-limiting example, the conceptual block diagram of FIG. 9B can be implemented by the following method steps shown in FIG. 10. In step 100 of FIG. 10, a signal(s) is received at the receivers 91A, 91B of FIG. 9B. The received signals are sampled and cross-correlated by correlator 93 in step 103. In step 109 of FIG. 10: (1) the phase angle is computed by phase function 97 and multiplied by factor; (2) an inverse function 99 inverts the multiplied phase angle; and (3) the inverted multiplied phase angle is multiplied by another factor to provide a multiplier output. In step 112, a sum of component values is computed and multiplied by the multiplier output in order to generate an estimate of the Doppler frequency $\hat{f}_D$.

Figure 11:
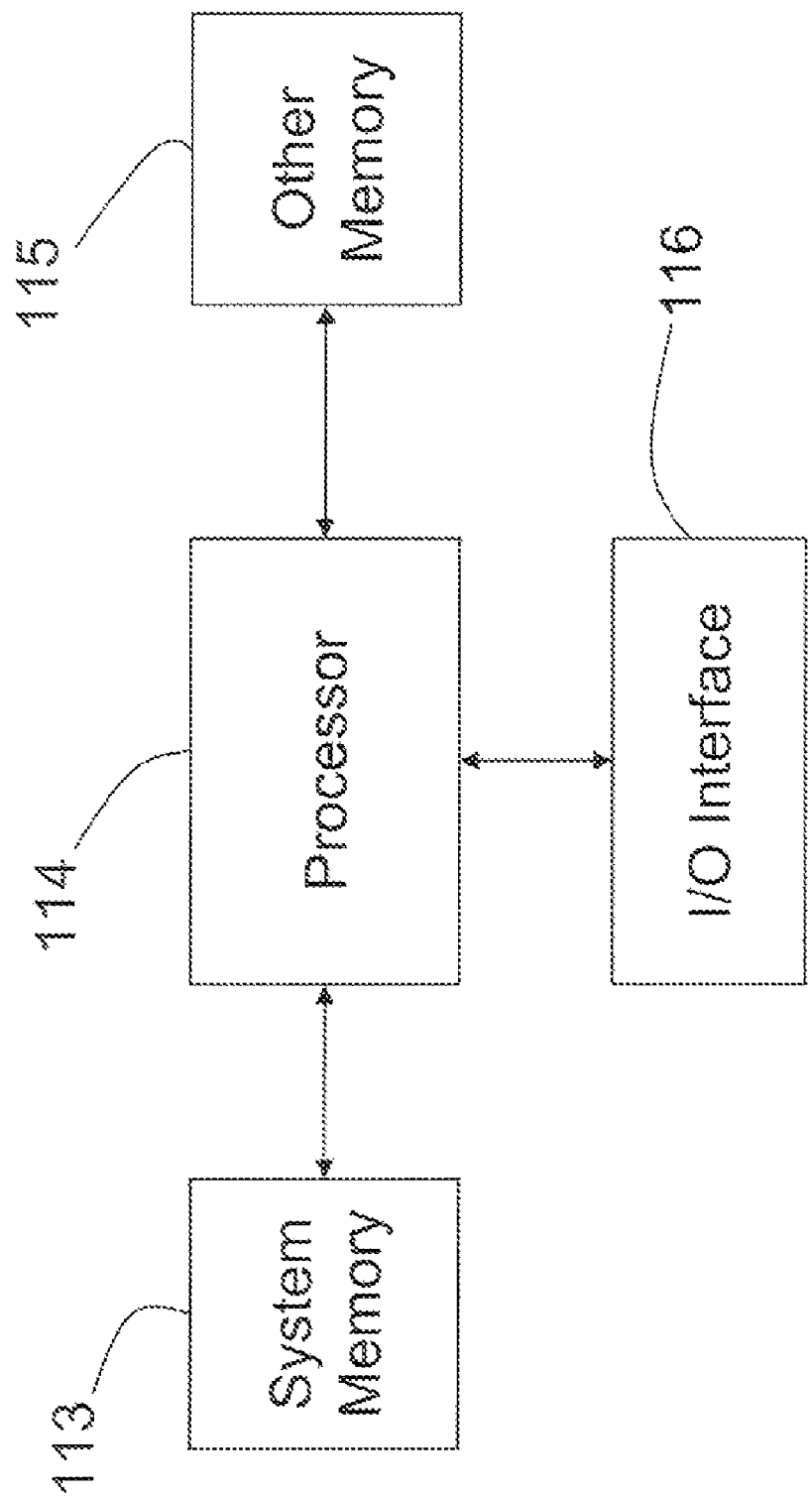
FIG. 11 shows an exemplary system that may be used to implement various forms and/or portions of embodiments of the invention.

As noted above, various embodiments of the invention may comprise hardware, software, computer-readable medium and/or firmware. FIG. 11 shows an exemplary system that may be used to implement various forms and/or portions of embodiments of the invention. As shown Such a computing system may include one or more processors 114, which may be coupled to one or more system memories 113. Such system memory 113 may include, for example, RAM, ROM, or other such machine-readable media, and system memory 113 may be used to incorporate, for example, a basic I/O system (BIOS), operating system, instructions for execution by processor 114, etc.

The system may also include other memory 115, such as additional RAM, ROM, hard disk drives, or other processor-readable media. Processor 114 may also be coupled to at least one input/output (I/O) interface 116. I/O interface 116 may include one or more user interfaces, as well as readers for various types of storage media and/or connections to one or more communication networks (e.g., communication interfaces and/or modems), from which, for example, software code may be obtained. Such a computing system may, for example, be used as a platform on which to run translation software and/or to control, house, or interface with an emulation system. Furthermore, other devices/media may also be coupled to and/or interact with the system shown in FIG. 11.

Applicant has attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method or apparatus in accordance with claimed subject matter being executed, such as one of the embodiments previously described, for example.

As one potential example, a computing platform may include an apparatus or means for implementing one or more processing units or processors, one or more input/output devices, such as a display, a keyboard and/or a mouse, and/or one or more memories, such as static random access memory, dynamic random access memory, flash memory, and/or a hard drive and one or more routers or firewall equipment. For example, a display may be employed to display one or more queries, such as those that may be interrelated, and or one or more tree expressions, although, again, claimed subject matter is not limited in scope to this example. Likewise, an embodiment may be implemented as a system, or as any combination of components such as computer systems and interfaces to computer systems (e.g., but not limited to: routers, firewalls, etc.), mobile and/or other types of communication systems and other well known electronic systems.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter.

While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method of estimating a Doppler frequency corresponding to a mobile station in a communication system, comprising:
   differentiating a received signal containing one or more components from one or more mobile stations;
   correlating the received signal;
   correlating the differentiated received signal;
   dividing the correlated received signal by the correlated differentiated received signal to obtain a correlation ratio; and
   processing the correlation ratio to obtain an estimate of a Doppler frequency of the received signal.

2. The method of claim 1, wherein processing the correlated received and correlated differentiated received signal further comprises:
   summing the divided signal with a first constant and producing a summed output; and
   computing the square-root of the summed output.

3. The method of claim 2, wherein generating the Doppler frequency estimate further comprises multiplying the square-root of the summed output by a second constant.

4. The method of claim 3, wherein the first constant is $-((\pi^2-6)\beta^2-3\pi^2)/(3T^2)$ and the second constant is $(1/\sqrt{2}\pi)$, where T represents a symbol period and $\beta$ represents a roll-off factor.

5. The method of claim 3, wherein the received signal contains a training sequence.

6. The method of claim 5, wherein the first constant is $((\pi^2)/(T^2))$ and the second constant is $(1/\sqrt{2}\pi)$, where T represents a symbol period.

7. A method of estimating a Doppler frequency corresponding to a mobile station in a communication system, comprising:
   correlating a received signal comprising one or more components received from one or more mobile stations;
   windowing and discrete time Fourier transform (DTFT) processing the correlated received signal;
   processing the windowed and DTFT processed correlated received signal; and
   generating the estimate of the Doppler frequency from the processed signals.

8. The method of claim 7, wherein processing the windowed and DTFT processed correlated received signal further comprises:
   computing arg max of a magnitude of the windowed and DTFT processed received signal;
   summing the computed arg max of the magnitude of the windowed and DTFT processed received signal with a first constant and producing a summed output; and
   computing the magnitude of the summed output.

9. The method of claim 8, wherein generating the Doppler frequency estimate further comprises multiplying the magnitude of the summed output by a second constant.

10. The method of claim 9, wherein the first constant is $(-1/(2T))$ and the second constant is $(P/T)$, where T represents a symbol period and P represents an oversampling rate.

11. The method of claim 10, wherein the received signal contains a training sequence.

12. The method of claim 7, wherein:
    said correlating the received signal comprises cross-correlating multiple received signals received at multiple antennas;
    said windowing and discrete time Fourier transform DTFT processing the correlated received signal comprises windowing and DTFT processing the cross-correlated multiple received signals; and
    said processing the windowed and DTFT processed correlated received signal comprises processing the windowed and DTFT processed cross-correlated multiple received signals.

13. The method of claim 12, wherein said processing the windowed and DTFT processed cross-correlated received signals comprises:
    computing arg max of a magnitude each of the windowed and DTFT processed multiple received signals to obtain respective maxima; and
    summing the computed maxima to obtain a summation of maxima; and
wherein said generating the estimate of the Doppler frequency from the processed received signals comprises:
    generating the estimate of the Doppler frequency from the summation of maxima.

14. The method of claim 12, further comprising:
    computing a phase for each of the cross-correlated multiple received signals; and
    processing the computed phases for the cross-correlated multiple received signals.

15. The method of claim 14, wherein processing the computed phase for the cross-correlated multiple received signals comprises:
    multiplying the computed phase for each of the cross-correlated multiple received signals by a first factor to produce a first product;
    inverting $\cos\alpha$, an estimate of a mean angle of arrival of a diffuse signal component, and multiplying by the first product; and
    multiplying the first product by a second factor.

16. The method of claim 15, wherein the first factor is $(-1/(2\pi\Delta))$ and the second factor is $(P/LT)$, where $\Delta=d/\lambda$ corresponds to antenna element spacing d divided by wavelength $\lambda$, P is an oversampling factor, L is a number of antenna elements, and T is a symbol period.

17. The method of claim 16, wherein the received signal contains a training sequence.

18. A non-transitory processor-readable medium containing processor-executable code that, if executed by a processor, causes the processor to implement a method of estimating a Doppler frequency of a received signal corresponding to one or more mobile stations in a communication system, comprising:
    differentiating a received signal containing one or more components from one or more mobile stations;
    correlating the received signal;
    correlating the differentiated received signal;
    dividing the correlated received signal by the correlated differentiated received signal to obtain a correlation ratio; and
    processing the correlation ratio to obtain an estimate of a Doppler frequency of the received signal.

19. The medium of claim 18, wherein processing the correlated received and correlated differentiated received signal further comprises:
    summing the divided signal with a first constant and producing a summed output; and computing the square-root of the summed output.

20. The medium of claim 19, wherein generating the Doppler frequency estimate further comprises multiplying the square-root of the summed output by a second constant.

21. A non-transitory processor-readable medium containing processor-executable code that, if executed by a processor, causes the processor to implement a method of estimating a Doppler frequency of a received signal corresponding to one or more mobile stations in a communication system, comprising:
  correlating a received signal comprising one or more components received from one or more mobile stations;
  windowing and discrete time Fourier transform (DTFT) processing the correlated received signal;
  processing the windowed and DTFT processed correlated received signal; and
  generating the estimate of the Doppler frequency from the processed signals.

22. The medium of claim 21, wherein processing the windowed and DTFT processed correlated received signal further comprises:
  computing arg max of a magnitude of the windowed and DTFT processed received signal;
  summing the computed arg max of the magnitude of the windowed and DTFT processed received signal with a first constant and producing a summed output; and
  computing the magnitude of the summed output.

23. The medium of claim 22, wherein generating the Doppler frequency estimate further comprises multiplying the magnitude of the summed output by a second constant.

24. The medium of claim 21, wherein:
  said correlating the received signal comprises cross-correlating multiple received signals received at multiple antennas;
  said windowing and discrete time Fourier transform DTFT processing the correlated received signal comprises windowing and DTFT processing the cross-correlated multiple received signals; and
  said processing the windowed and DTFT processed correlated received signal comprises processing the windowed and DTFT processed cross-correlated multiple received signals.

25. The medium of claim 24, wherein said processing the windowed and DTFT processed cross-correlated received signals comprises:
  computing arg max of a magnitude each of the windowed and DTFT processed multiple received signals to obtain respective maxima; and
  summing the computed maxima to obtain a summation of maxima; and
wherein said generating the estimate of the Doppler frequency from the processed received signals comprises:
  generating the estimate of the Doppler frequency from the summation of maxima.

26. The medium of claim 24, wherein the method further comprises:
  computing a phase for each of the cross-correlated multiple received signals; and
  processing the computed phases for the cross-correlated multiple received signals.

27. The medium of claim 26, wherein processing the computed phase for the cross-correlated multiple received signals comprises:
  multiplying the computed phase for each of the cross-correlated multiple received signals by a first factor to produce a first product;
  inverting côs α, an estimate of a mean angle of arrival of a diffuse signal component, and multiplying by the first product; and
  multiplying the first product by a second factor.

28. An apparatus, comprising:
  a receiver to receive a signal comprising one or more components received from one or more mobile stations of a communication network;
  a first correlator to correlate the received signal to obtain a first correlation;
  a differentiator to differentiate the received signal to obtain a differentiated signal;
  a second correlator to correlate the differentiated signal to obtain a second correlation;
  a divider to divide the first correlation by the second correlation to obtain a correlation ratio; and
  circuitry to process the correlation ratio to obtain an estimate of a Doppler frequency of the received signal.

29. The apparatus of claim 28, wherein the circuitry to process the correlation ratio comprises:
  an adder to add a first constant to the correlation ratio to obtain an intermediate sum;
  a square-root component to obtain a square-root of the intermediate sum; and
  a multiplier to multiple the square-root of the intermediate sum by a second constant.

30. The apparatus of claim 28, further comprising:
  a first sampling device to sample the received signal prior to the first correlator; and
  a second sampling device to sample the differentiated received signal prior to the second correlator.

31. An apparatus, comprising:
  at least one receiver to receive a signal comprising one or more components received from one or more mobile stations of a communication network;
  at least one correlator to correlate the received signal to obtain a correlation;
  at least one windowing and discrete-time Fourier transform (DTFT) block to obtain a windowed and DTFT processed signal; and
  at least one circuit to process the windowed and DTFT processed signal to obtain an estimate of a Doppler frequency of the received signal.

32. The apparatus of claim 31, wherein the at least one circuit to process the windowed and DTFT processed signal comprises:
  an arg max device to obtain a maximum argument of a magnitude of the windowed and DTFT processed signal;
  an adder to add a first constant to the maximum argument to obtain an intermediate sum;
  a magnitude block to obtain a magnitude of the intermediate sum; and
  a multiplier to multiply the magnitude of the intermediate sum by a second constant.

33. The apparatus of claim 31, wherein said at least one receiver comprises multiple receivers coupled to multiple antennas, wherein said at least one correlator comprises a number of correlators corresponding to a number of the multiple receivers, wherein the at least one windowing and DTFT processing block comprises a number of windowing and DTFT processing blocks corresponding to the number of multiple receivers, and wherein each of the correlators is coupled to receive a respective receiver output and to provide an input to a respective windowing and DTFT processing block.

34. The apparatus of claim 33, wherein said at least one circuit comprises a number of circuits corresponding to the number of receivers, and wherein each circuit is coupled to receive an output of a respective windowing and DTFT processing block.

35. The apparatus of claim 33, wherein each of said correlators comprises a cross- correlator coupled to receive and correlate outputs from two of said receivers.

36. The apparatus of claim 35, further comprising:
 circuitry to obtain a phase of at least one of the cross-correlator outputs; and
 circuitry to obtain an output based on the phase.

37. The apparatus of claim 36, wherein the circuitry to obtain an output based on the phase comprises:
 a first multiplier to multiply the phase by a first constant;
 an inverter to invert the output of the multiplier; and
 a second multiplier to multiply the output of the inverter by a second constant.

38. The apparatus of claim 37, wherein said at least one circuit is adapted to obtain a Doppler frequency estimate by using the output based on the phase as a multiplicative quantity.

\* \* \* \* \*

UNITED STATES PATENT AND TRADEMARK OFFICE
CERTIFICATE OF CORRECTION

PATENT NO. : 8,209,150 B2
APPLICATION NO. : 11/944279
DATED : June 26, 2012
INVENTOR(S) : Zhang et al.

It is certified that error appears in the above-identified patent and that said Letters Patent is hereby corrected as shown below:

IN THE SPECIFICATIONS:

In Column 4, Line 67, delete "(n-m)" and insert -- (n-m). --, therefor.

In Column 5, Line 25, delete "$r_{\ddot{h}}(0) = -r_h(\tau)|_{\Sigma=0} = 2\pi^2 f_D^2,$" and insert -- $r_{\ddot{h}}(0) = -r_h(\tau)|_{\tau=0} = 2\pi^2 f_D^2,$ --, therefor.

In Column 5, Line 30, in Equation 10, delete "$R_{\ddot{z}}(k;0) = 2\pi^2 f_D R_s(k;0) + R_{\ddot{s}}(k;0) + r(0)\delta_k,$" and insert -- $R_{\ddot{z}}(k;0) = 2\pi^2 f_D R_s(k;0) + R_{\ddot{s}}(k;0) + r_{\ddot{v}}(0)\delta_k,$ --, therefor.

In Column 8, Line 29, delete "$r_z((b-a)A, (t;0))$" and insert -- $r_z((b-a)\Delta, (t;0))$ --, therefor.

In Column 10, Line 2, delete "K=100" and insert -- κ=100, --, therefor.

IN THE CLAIMS:

In Column 14, Line 16, in Claim 13, delete "magnitude each" and insert -- magnitude for each --, therefor.

Signed and Sealed this
Sixteenth Day of October, 2012

David J. Kappos
*Director of the United States Patent and Trademark Office*